(12) United States Patent
Sugaya et al.

(10) Patent No.: US 6,266,650 B1
(45) Date of Patent: Jul. 24, 2001

(54) MAIL-ORDER SHOPPING SYSTEM, AND DVD AND ADAPTER BOTH FOR USE IN THE MAIL-ORDER SHOPPING SYSTEM

(75) Inventors: Toshihiro Sugaya, Ibaraki-ken; Kimiyoshi Ban, Kawasaki, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/900,572

(22) Filed: Jul. 25, 1997

(30) Foreign Application Priority Data

Jul. 26, 1996 (JP) .................................................. 8-197857

(51) Int. Cl.[7] .................................................... H04N 7/00
(52) U.S. Cl. .................................. 705/27; 705/26; 348/13
(58) Field of Search ........................................ 705/27, 26

(56) References Cited

U.S. PATENT DOCUMENTS

| | | | |
|---|---|---|---|
| 4,805,119 | * | 2/1989 | Maeda et al. .......................... 345/357 |
| 4,894,789 | * | 1/1990 | Yee ....................................... 364/521 |
| 5,231,566 | * | 7/1993 | Blutinger et al. ....................... 705/27 |
| 5,451,998 | * | 9/1995 | Hamrick ................................ 348/13 |
| 5,459,712 | | 10/1995 | Sugaya et al. ..................... 369/275.4 |
| 5,638,426 | * | 6/1997 | Lewis ...................................... 379/90 |
| 5,668,592 | * | 9/1997 | Spaulding II .......................... 348/13 |
| 5,721,832 | * | 2/1998 | Westrope et al. ...................... 705/27 |
| 5,793,779 | * | 8/1998 | Yonemitsu et al. .................. 371/402 |
| 5,832,459 | * | 11/1998 | Cameron et al. ...................... 705/26 |
| 5,848,399 | * | 12/1998 | Burke ..................................... 705/27 |
| 5,870,717 | * | 2/1999 | Wiecha ................................. 705/26 |

FOREIGN PATENT DOCUMENTS 5-298336  11/1993  (JP) .
5-298338  11/1993  (JP) .
8-37508   2/1996   (JP) .

OTHER PUBLICATIONS

McCarthy, Shira, "DVD promises an interim step towards interactive video", Telephony v229n22, pp 22, Nov. 27, 1995.*
Day, Rebecca, "DVD—Driving the Video Disk", OEM Magazine, Jan. 2, 1996, n 324, PG66.*
Seideman Tony; "Multimedia Marketing"; International Business' Aug. 1994.*
"In Internet's Shadow, a Niche for CD–ROM"; Chain Store Age, Jun. 1996.*
Tucker Michael J.; "CD–ROM Transition to Transaction"; CD–ROM Professional, pp. 31–42; Feb. 1995.*

* cited by examiner

Primary Examiner—Allen R. MacDonald
Assistant Examiner—Jagdish Patel
(74) Attorney, Agent, or Firm—Pillsbury Winthrop LLP (57) ABSTRACT

The present invention is directed to a mail-order shopping system which allows a user to do electronic mail-order shopping by a simple operation without using a personal computer and to correctly acquire information of goods. An adapter including both a memory for registering user's information specifying a user and a modem for communicating with a mail-order firm, is connected to the DVD reproduction apparatus. The catalog information, recognition information of the mail-order firm, and communication programs representing a procedure for communication from the user to the mail-order firm, which are stored in a DVD for mail-order shopping, are reproduced by the DVD reproduction apparatus. The catalog information is displayed on a TV display, and both information of desired goods selected by the user and user's information registered in the memory of the adapter, are transmitted through a modem on the basis of the reproduced communication programs.

37 Claims, 7 Drawing Sheets

| TELEPHONE NUMBER | | ADDRESS |
|---|---|---|
| TOLL NUMBER | LOCAL OFFICE NUMBER | |
| ⋮ | ⋮ | ⋮ |
| 044 | 548 | KAWASAKI-SHI SAIWAI-KU YANAGICHOU |
| 044 | 549 | KAWASAKI-SHI SAIWAIKU KOMUKAITOSHIBA CHOU |
| ⋮ | ⋮ | ⋮ |

MAIL-ORDER SHOPPING SYSTEM, AND DVD AND ADAPTER BOTH FOR USE IN THE MAIL-ORDER SHOPPING SYSTEM

BACKGROUND OF THE INVENTION

The present invention specifically relates to a mail-order shopping system utilizing a DVD as a catalog of goods and also to a DVD and an adapter both for use in the mail-order shopping system.

In a conventional mail-order shopping system, a user looks through a catalog distributed from a mail-order firm and chooses desired goods from the catalog. The user orders the goods and provides the firm with information about the desired goods such as the name of the goods (e.g., number, code, etc. assigned to the goods), the size, the color, and the quantity desired. The user also provides user information such as a membership number, a zip code, an address, a name and a telephone number. This information is provided by telephone, facsimile or mail, and then the firm delivers the ordered goods to the address specified. The cost of the goods is paid by automatically drawing money from a user's bank account, by paying money into a mail-order firm's account, or by COD (collect on delivery).

The above conventional mail-order shopping system has the disadvantage that as the goods listed in a catalog increase in number, the catalog bulks up in size and its handling becomes troublesome. Furthermore, because the merchandise in the catalog makes a one-sided impression on the user, the user often purchases goods which are different from those he or she desired.

On the other hand, electronic mail-order shopping systems using personal computers have been put to practical use in light of the pervasiveness of personal computer networks and the Internet. One method, which employs a CD-ROM as a catalog and has been recognized as an electronic publishing medium, is proposed in, e.g., Jpn. Pat. Appln. (KOKAI) Publication No. 5-298336. According to this method, a user chooses desired goods from displayed catalog information of the CD-ROM, and inputs goods information such as a name, a size, a color, and quantity and user's information such as a membership number, a zip code, an address, a name and a telephone number through a keyboard. Both the goods information and user's information are transmitted to the mail-order firm.

However, the conventional electronic mail-order shopping system has a drawback wherein it is based on the premise of using a personal computer and thus cannot be used by anyone who is inexperienced with computers. Moreover, because the user's information contains a variety of items are described above, it is complicated even for computer-savvy users to input the information by a keyboard for every electronic mail order.

In the catalog stored in the CD-ROM, the images of goods or of those goods actually in use, are basically still images because of the limitations in storage capacity. Utilizing the image compression coding technique such as the MPEG1 standard, catalog information of animation can be stored in the CD-ROM, but high-quality images cannot be expected using the MPEG1 standard.

For the above reasons, the tone of goods, the feel of material thereof, the feel of use thereof, etc. cannot be known exactly from the CD-ROM used as a catalog.

As described above, the mail-order shopping systems which use a CD-ROM and which require the use of a personal computer, make it difficult for those inexperienced in computers to employ the system efficiently, while still making it complicated for experienced users to input information. Furthermore, the catalog information is basically displayed by still images and, even though it is done by dynamic images, no high quality can be expected. Thus, goods information such as the tone of goods, the feel of material thereof, the feel of use thereof or the like, cannot correctly be obtained.

BRIEF SUMMARY OF THE INVENTION

An object of the present invention is to provide a mail-order shopping system capable of simple operation, without the use of personal computers, while enabling a user to acquire more exact information regarding the desired goods.

Another object of the present invention is to provide a DVD to be utilized by the mail-order shopping system.

Still another object of the present invention is to provide an adapter for use in a mail-order shopping system.

To attain the above objects in the present invention, mail-order shopping is done using a DVD reproduction apparatus and using a DVD capable of recording high-quality dynamic and still images in catalog form. The mail-order shopping can be achieved by simply adding an adapter to the DVD reproduction apparatus.

According to a first aspect of the present invention, there is provided a mail-order shopping system comprising:

reproduction means for reproducing catalog information from a first storage means storing the catalog information of different goods, recognition information of a mail-order firm, and communication programs representing a procedure for communication from a user to the mail-order firm;

designation means for designating user desired goods from the catalog information reproduced by the reproduction means;

second storage means for storing user's information specifying a user; and transmission means for transmitting information of the desired goods designated by the designation means and the user's information stored in the second storage means to the mail-order firm based on both the communication program stored in the first storage means and the recognition information of the mail-order firm.

According to a second aspect of the present invention, there is provided a mail-order shopping system comprising:

reproduction means for reproducing catalog information from a first storage means storing catalog information of different goods, recognition information of a mail-order firm, and communication programs representing a procedure for communication from a user to the mail-order firm;

designation means for designating user desired goods from the catalog information reproduced by the reproduction means;

second storage means for storing user's information specifying a user;

determination means for determining whether the user's information is stored in the second storage means;

instruction means for instructing the user to register the user's information when the determination means determines that the user's information is not stored in the second storage means;

registration means for registering the user's information in the second storage means when the instruction means instructs the user to register the user's information; and transmission means for transmitting information of the desired goods designated by the designation means and the user's information stored in the second storage means to the mail-order firm based on both the communication program stored in the first storage means and the recognition information of the mail-order firm.

According to a third aspect of the present invention, there is provided a mail-order shopping system comprising:

a DVD reproduction apparatus for reproducing catalog information of different goods, recognition information of a mail-order firm, and communication programs representing a procedure for communication from a user to the mail-order firm from a mail-order shopping DVD in which the catalog information, the recognition information, and the communication programs;

selection means for selecting desired goods from among the catalog information reproduced by the DVD reproduction apparatus; and an adapter including a memory for registering user's information specifying a user and a modem for communication between the DVD reproduction apparatus and the mail-order firm, wherein both information of the desired goods selected by the selection means and the user's information registered in the memory are transmitted to the mail-order firm through the modem, based on the communication programs and the recognition information reproduced by the DVD reproduction apparatus.

According to a fourth aspect of the present invention, there is provided a mail-order shopping system comprising:

a DVD reproduction apparatus for reproducing catalog information of different goods, recognition information of a mail-order firm, and communication programs representing a procedure for communication from a user to the mail-order firm from a mail-order shopping DVD in which the catalog information, the recognition information, and the communication programs; and an adapter connected to the DVD reproduction apparatus and including a memory for registering user's information specifying a user and a modem for communication between the DVD reproduction apparatus and the mail-order firm, wherein the communication programs cause DVD reproduction apparatus to read the recognition information of the mail-order firm stored in the mail-order shopping DVD and cause the modem to transmit both the user's information and information of desired goods registered in the memory to the mail-order firm after a line is connected to the mail-order firm based on the recognition information read by the DVD reproduction apparatus.

According to a fifth aspect of the present invention, there is provided a mail-order shopping system comprising:

a DVD reproduction apparatus for reproducing catalog information of different goods, recognition information of a mail-order firm, and communication programs representing a procedure for communication from a user to the mail-order firm from a mail-order shopping DVD in which the catalog information, the recognition information, and the communication programs; and an adapter connected to the DVD reproduction apparatus and including a memory for registering user's information specifying a user and a modem for communication between the DVD reproduction apparatus and the mail-order firm, wherein the communication programs cause the DVD reproduction apparatus to check whether the user's information is registered in the memory when the user information is stored in the memory and cause the DVD reproduction apparatus to read the recognition information of the mail-order firm stored in the mail-order shopping DVD and cause the modem to transmit both the user's information and information of desired goods registered in the memory to the mail-order firm after a line is connected to the mail-order firm based on the recognition information.

In the mail-order shopping system described above, catalog information is reproduced from the DVD by the DVD reproduction apparatus and displayed on a display means. If a user chooses goods from the displayed information, the recognition information of a mail-order firm is automatically dialed to form a telephonic connection from the user to the mail-order firm so that information regarding the desired goods, such as name (number, code, etc. assigned to the goods), size, color, and quantity as well as user information such as membership number, zip code, address, name and telephone number, can be transmitted to the mail-order firm.

A variety of user information items are registered in the memory. Since these information items are automatically transmitted when a user orders the desired goods, the user's burden is remarkably lightened and even one inexperienced in personal computers can easily order goods.

According to a sixth aspect of the present invention, there is provided a mail-order shopping system comprising:

reproduction means for reproducing catalog information, recognition information, communication programs, and address database from a first storage means storing the catalog information of different goods, recognition information of a mail-order firm, communication programs representing a procedure for communication from a user to the mail-order firm, and an address database describing address data corresponding to the recognition information;

designation means for designating user desired goods from the catalog information reproduced by the reproduction means;

second storage means for storing user's information specifying a user;

determination means for determining whether the user's information is stored in the second storage means;

instruction means for instructing the user to register the user's information when the determination means determines that the user's information is not stored in the second storage means;

registration means for registering the user's information in the second storage means, using both user's recognition information and the address database stored in the storage means, when the instruction means instructs the user to register the user's information; and transmission means for transmitting the recognition information of the mail-order firm, information of the desired goods designated by the designation means, and the user's information registered in the second storage means by the registration means, to the mail-order firm based on the communication program stored in the first storage means.

Operability can be further enhanced by using the address database, wherein town or street names can be obtained therefrom. If only numeric keys corresponding to numeric parts of the address are inputted in addition to the town or street number, the most complicated address data input operation can easily be performed when the user's information is registered.

The address data stored and registered in the memory need not be inputted again except when it is changed. If address data is inputted in advance in a shop or the like, a user simply confirms his or her address and need not input it, thus further simplifying the order operation.

According to a seventh aspect of the present invention, there is provided a DVD for mail-order shopping, in which catalog information of different goods, recognition information of a mail-order firm, and communication programs representing a procedure for communication from a user to the mail-order, are stored, wherein the communication programs comprises:

first instruction means for instructing a DVD reproduction apparatus to read the recognition information of the mail-order firm stored in the DVD; and second instruction means for instructing a modem to transmit both the user's information and information of desired goods registered in advance in the memory to the mail-order firm after a line is connected to the mail-order firm based on the recognition information of the mail-order firm read by the DVD reproduction apparatus.

According to an eighth aspect of the present invention, there is provided a DVD for mail-order shopping, in which catalog information of different goods, recognition information of a mail-order firm, and communication programs representing a procedure for communication from a user to the mail-order, are stored, wherein the communication programs comprise:

first instruction means for instructing a DVD reproduction apparatus to read the recognition information of the mail-order firm stored in the DVD; and second instruction means for checking whether user's information is registered in a memory of an adapter connected to the DVD reproduction apparatus and for causing a modem to transmit both the user's information and information of desired goods registered in advance in the memory to the mail-order firm after a line is connected to the mail-order firm based on the recognition information of the mail-order firm read by the DVD reproduction apparatus when the user's is registered.

According to a ninth embodiment of the present invention, there is provided an adapter for mail-order shopping, connected to a DVD reproduction apparatus for reproducing information stored in a DVD, the adapter comprising:

a memory for registering user's information specifying a user of the DVD reproduction apparatus; and a modem for transmitting the user's information registered in the memory from the DVD reproduction apparatus to a mail-order firm.

If the adapter for mail-order shopping is connected to a DVD reproduction apparatus having a communication function, and the mail-order shopping can be achieved through a simple operation.

The only information required to be transmitted from a user to mail-order firm is the desired goods information and the user information. Since the amount of information is small, a modem of 1.2 kbps, the speed of which is lower than that of a modem used for a personal computer network, can be used. This adapter can thus be decreased in size and cost.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
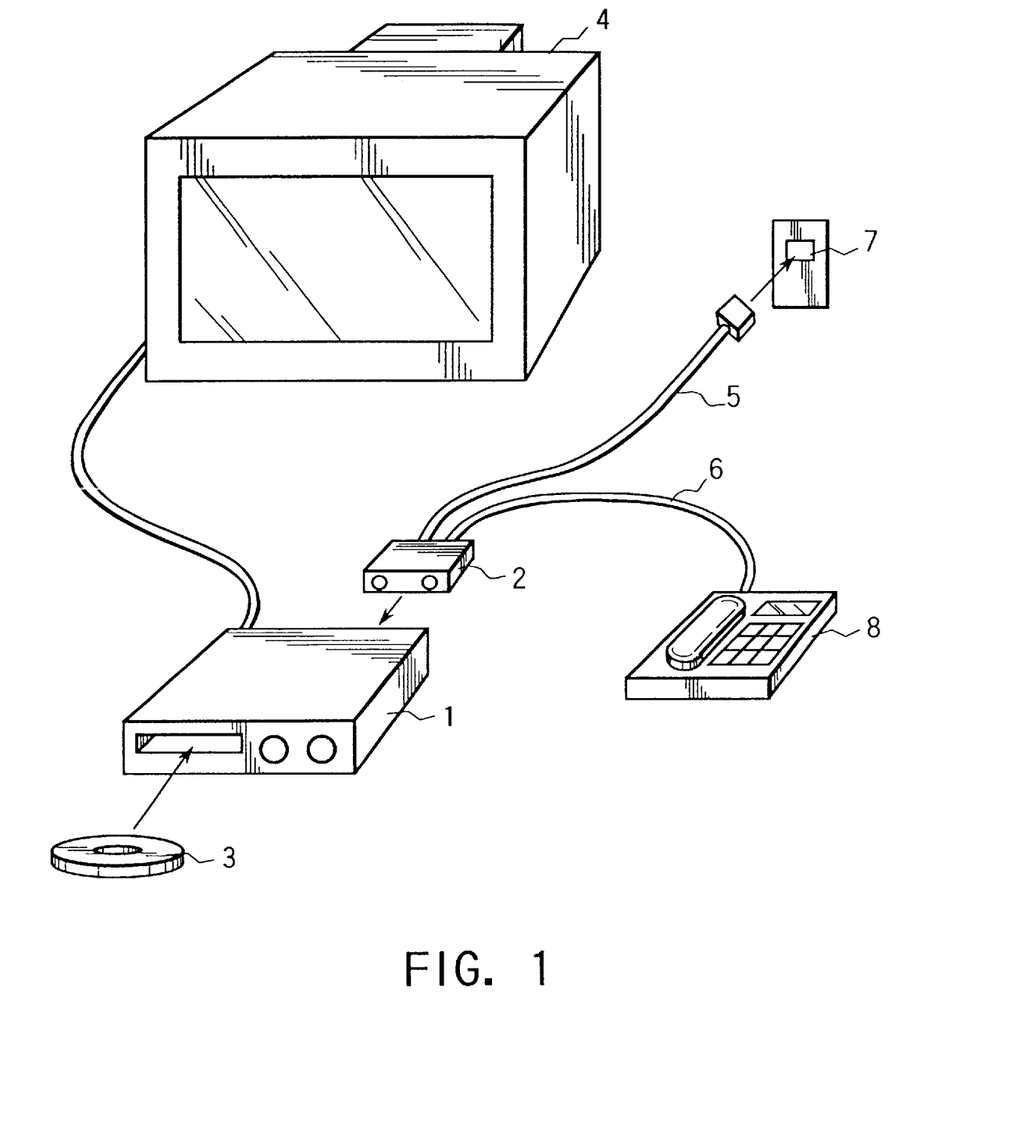
FIG. 1 is a view illustrating a user-side shopping system of a mail-order shopping system according to an embodiment of the present invention.
Figure 2:
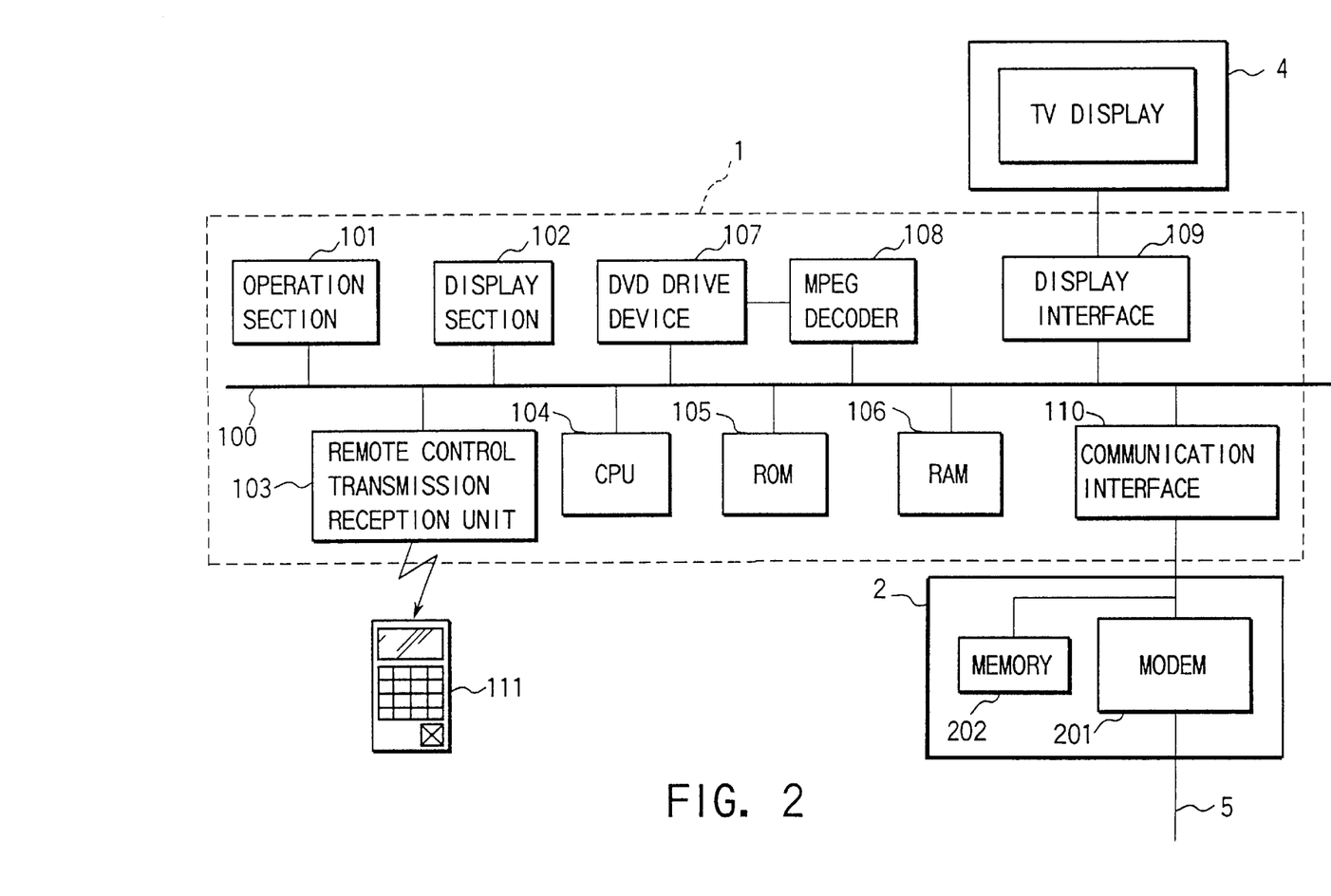
FIG. 2 is a block diagram of the user-side shopping system of the mail-order shopping system according to the embodiment of the present invention.

FIG. 1 is a view illustrating a user-side system of a mail-order shopping system according to an embodiment of the present invention, while FIG. 2 is a block diagram showing the inside of a DVD reproduction apparatus.

The mail-order shopping system is constituted by combining an adapter 2 for mail-order shopping and a TV display 4 with a DVD reproduction apparatus 1. When a user chooses goods by the shopping system, a DVD 3 serving as a catalog is set in the DVD reproduction apparatus 1, and the catalog information is displayed on the TV display 4 connected to the apparatus 1.

The DVD 3 stores a telephone number of a mail-order firm, a communication program which provides the communication procedure necessary to order goods with the mail-order firm, and catalog information of still and dynamic images which are compressed and coded by the MPEG2 standard. More favorably, the DVD 3 stores an address database of addresses including the names of towns or streets corresponding to toll exchange numbers and local exchange numbers of telephone numbers.

In the DVD reproduction apparatus 1, as shown in FIG. 2, an operation section 101, a display section 102, a remote control transmission/reception section 103, a CPU 104, a ROM 105, a RAM 106, a DVD drive device 107, an MPEG decoder 108 meeting the MPEG2 standard, a display interface 109 and a communication interface 110 are connected to a system bus 100 comprising a data bus, an address bus, a control bus and the like. A remote control unit 111 is prepared as an accessory of the DVD reproduction apparatus 1.

The operation section 101 mainly performs the basic operations of turning-on/turning-off the apparatus 1, start/end of playback, fast forward, and rewind. The remote control unit 111 performs various operations necessary for DVD reproduction through the remote control transmission/reception section 103, in addition to the same operations as those of the operation section 101. The section 101 is constituted so that a user can move a cursor on the catalog information displayed on the TV display 4 to choose desired goods together with its size, color and quantity, etc. and then execute the purchase of the chosen goods.

The cursor can be moved up and down, right and left, using cursor keys provided on the remote control unit 111, and the goods can be purchased by performing a predetermined key operation. The remote control unit 111 is capable of not only inputting numerals but also inputting "hiragana" (i.e. cursive Japanese phonetic syllabary) and "katakana" (i.e. angular Japanese phonetic syllabary) using a sequential key and the like, and inputting "kanji" (i.e. Chinese characters) depending on the need.

The display section 102 is designed to display major information related to the operation and, more specifically, an operation mode, a screen number, etc. The same display as that of the display section 102 can be performed on the TV display 4.

The CPU 104 controls respective constituting elements including the DVD drive device 107 and the MPEG decoder 108 connected to the system bus 100. The CPU 104a executes various types of processing in accordance with execution programs stored in the ROM 105 and the communication programs stored in the DVD 3, particularly when performing shopping operations through the DVD 3. The RAM 106 is a working memory for temporarily storing various types of data being processed.

The DVD drive device 107 includes a spindle motor for driving the DVD 3 under the control of the CPU 104, an optical head for reading information from the DVD 3, and various signal processing circuits. The drive device 107 outputs a telephone number of the mail-order firm, data of the communication program and address data of the mail-order firm as well as data coded by the MPEG2 standard, particularly when performing shopping operations through the DVD.

The MPEG decoder 108 decodes the coded data to reproduce the original image signal. The reproduced image signal is transmitted to the TV display 4 via the display interface 109 and displayed thereon. On the other hand, the communication program reproduced by the DVD drive device 107 during the shopping, the telephone number, and the address data of the mail-order firm are derived from the CPU 104.

The communication interface 110 is intended to communicate between the DVD reproduction apparatus 1 communicate between the DVD reproduction apparatus 1 and an external device. This interface 110 is utilized in doing shopping through the DVD.

The adapter 2 is an optional device which is detachable from the apparatus 1. This adapter includes at least two modular jacks as well as a connecting terminal to the apparatus 1. One of the modular jacks is connected to an outlet 7 drawn indoors through a telephone cable 5, while the other jack is connected to a telephone set 8 through a telephone cable 6.

Figure 3:
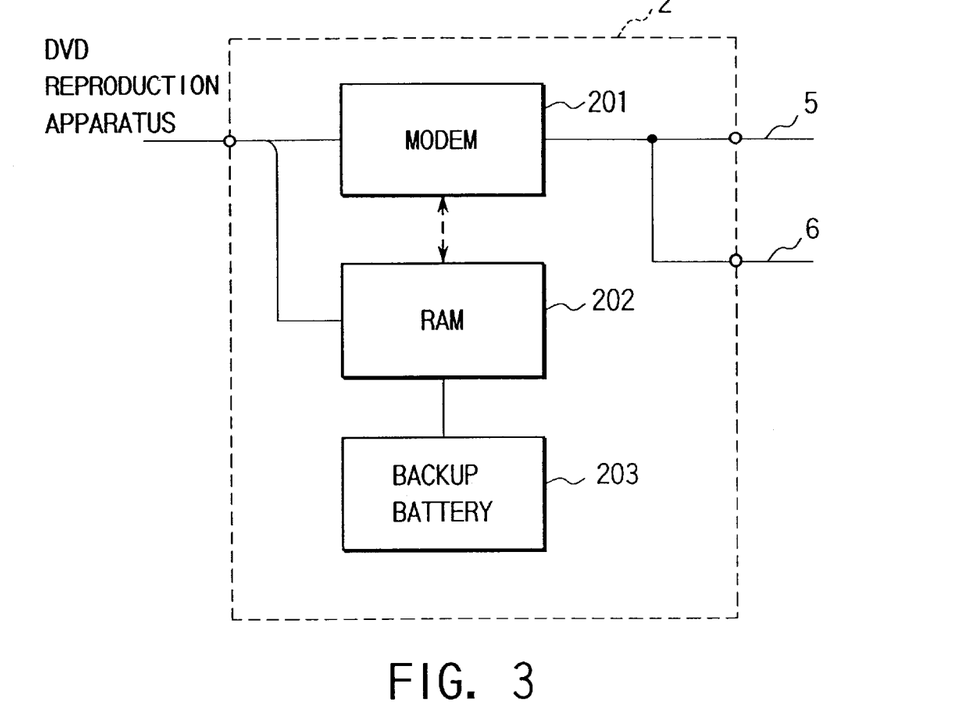
FIG. 3 is a block diagram of the inside of an adapter for mail order shopping according to the embodiment of the present invention.
Figure 4:
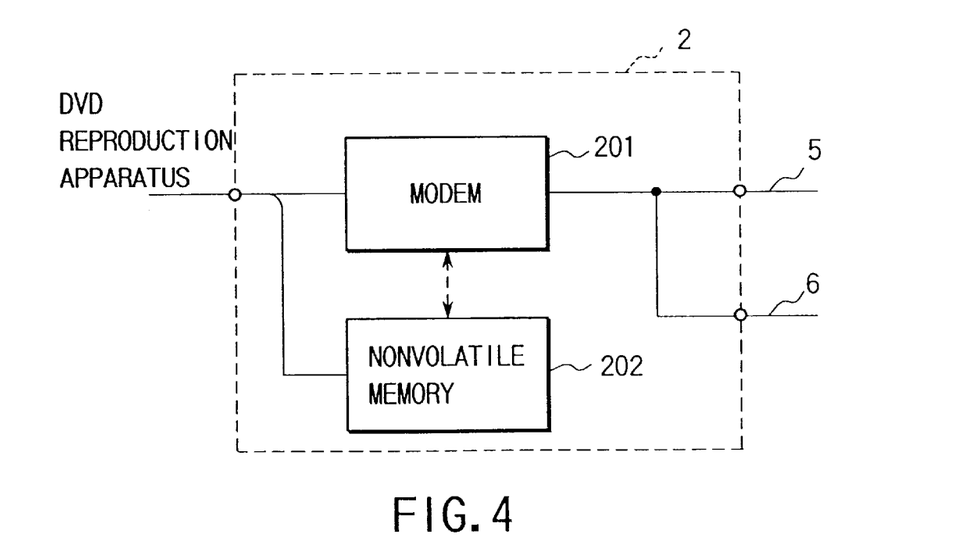
FIG. 4 is a block diagram of the inside of another adapter for mail order according to the embodiment of the present invention.

The adapter 2 includes a modem 201 and a memory 202. The modem 201 is connected between the communication interface 110 and telephone cable 5 in order to convert a digital signal, outputted from the DVD reproduction apparatus 1, into a tone signal (multi-frequency signal) or a dial pulse and transmits it to the telephone cable 5. Conversely, the modem 201 converts a tone signal or a dial pulse, inputted through the telephone cable 5, into a digital signal and transmits it to the apparatus 1.

The memory 202 is connected to the communication interface 110 and used to record user information, such as a user's membership number, zip code, address, name and telephone number, using the DVD reproduction apparatus 1. If a RAM is used as the memory 202 as shown in FIG. 3, the information stored therein is held by a backup battery 203 in order to prevent the information from being lost even when power is cut off. Further, as shown in FIG. 4, a nonvolatile memory such as an EPROM can be used as the memory 202.

Figure 5A:
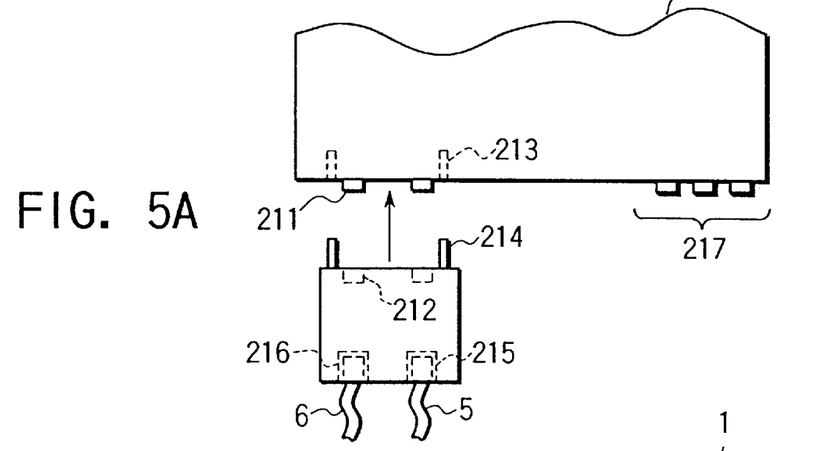
FIG. 5A is a plan view showing an example of attaching an adapter to a DVD reproduction apparatus according to the embodiment of the present invention.
Figure 5B:
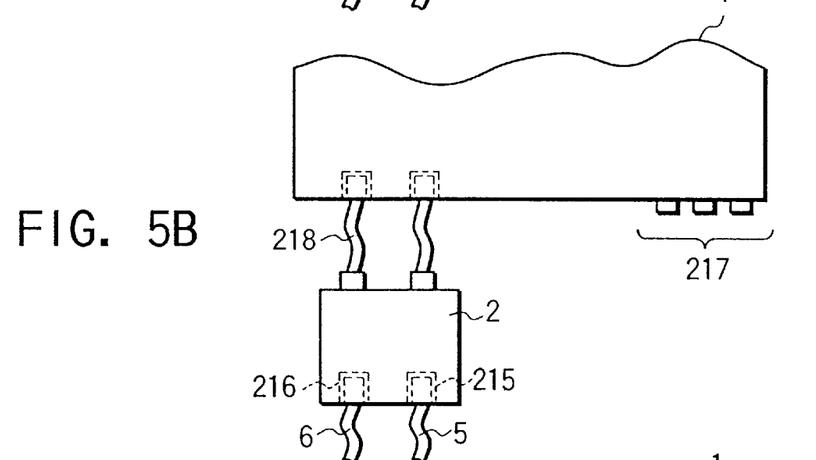
FIG. 5B is a plan view showing another example of attaching an adapter to a DVD reproduction apparatus according to the embodiment of the present invention.
Figure 5C:
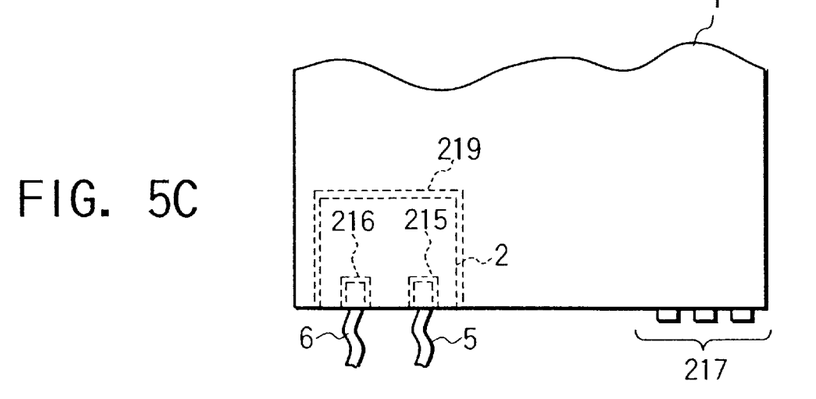
FIG. 5C is a plan view showing still another example of attaching an adapter to a DVD reproduction apparatus according to the embodiment of the present invention.

As described above, the adapter 2 is detachable from the DVD reproduction apparatus 1. FIGS. 5A to 5C illustrate examples of attaching the adapter 2 to the apparatus 1.

In the example of FIG. 5A, a digital I/O terminal 211 of the communication interface 110, which is provided on the back of the DVD reproduction apparatus 1, and a digital I/O terminal 212 of the adapter 2 are directly connected to each other. The adapter 2 is positioned by inserting a guide pin 214 of the adapter 2 into a guide hole 213 formed in the apparatus 1 and fixed by a fixing means (not shown).

The telephone cable 5 and 6 are connected to the adapter 2 by modular jacks 215 and 216. Other terminals 217 provided on the back of the apparatus 1 are AV (audio video) terminals connected to the TV display 4.

In the example of FIG. 5B, the DVD reproduction apparatus 1 and adapter 2 are connected by a digital signal cable 218.

In the example of FIG. 5C, a slot 219 is formed in the body of the apparatus 1, and the adapter 2 is fitted into the slot 219 and at the same time the digital I/O terminals of the apparatus 1 and adapter 2 are connected to each other.

Figure 6:
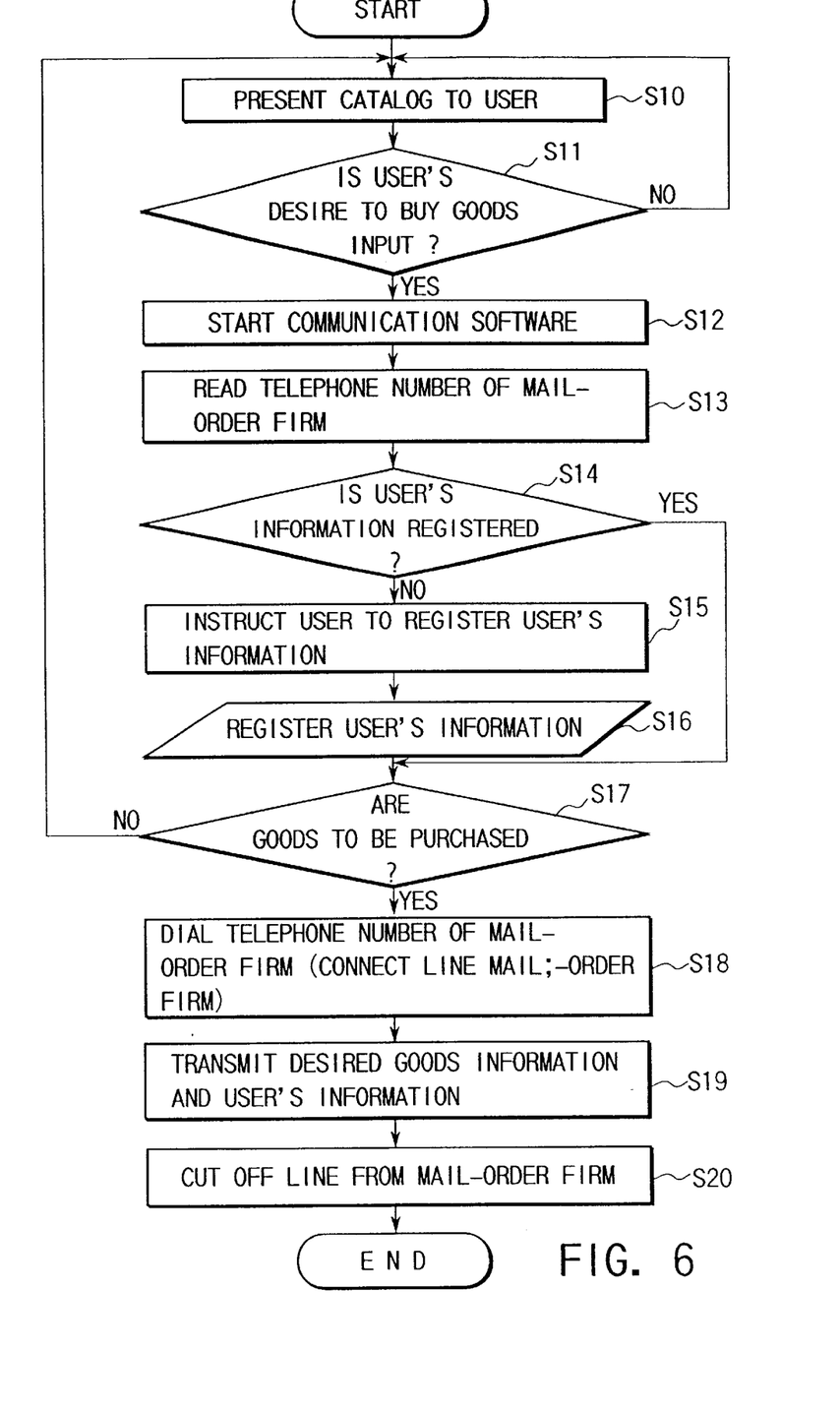
FIG. 6 is a flowchart of the procedure for the mail-order shopping system according to the embodiment of the present invention.

The process of the mail-order shopping system of the present invention will now be described using the flowchart shown in FIG. 6.

First, the DVD 3 is set in the DVD drive device 107 to reproduce information stored in the DVD 3 by the DVD reproduction apparatus 1, and catalog information is displayed on the TV display 4 in order to be presented to a user (step S10).

A reproduction signal (i.e. coded image data) read by the DVD drive device 107 under the control of the CPU 104, is decoded through the MPEG decoder 108, and the decoded signal is supplied to the TV display 4 via the display interface 109. Catalog information is thus displayed on the TV display 4.

For example, the catalog information can be reproduced and displayed by the following methods: (1) of the catalog information stored in the DVD 3, information of new goods, noteworthy goods, etc. is first reproduced and displayed, and then the catalog information is automatically selected in predetermined order and reproduced and displayed; and (2) first the table of contents is displayed and reproduced, then a user designates a desired category from the table, and catalog information of goods in the designated category is reproduced and displayed in sequence.

Furthermore, a still image of the goods is reproduced and displayed as a basic image and then the state of the goods actually being used can be presented as a dynamic image (i.e. if the goods are clothes, the appearance of the clothes on a walking person, is reproduced and displayed as a dynamic image).

Since the DVD has a large capacity, capable of recording high-quality images by the MPEG2 standard, the catalog information can be displayed realistically and with a good feel of material. It is needless to say that the description of goods can be not only displayed by letters or characters but also indicated by both voice and letters or characters.

Figure 7:
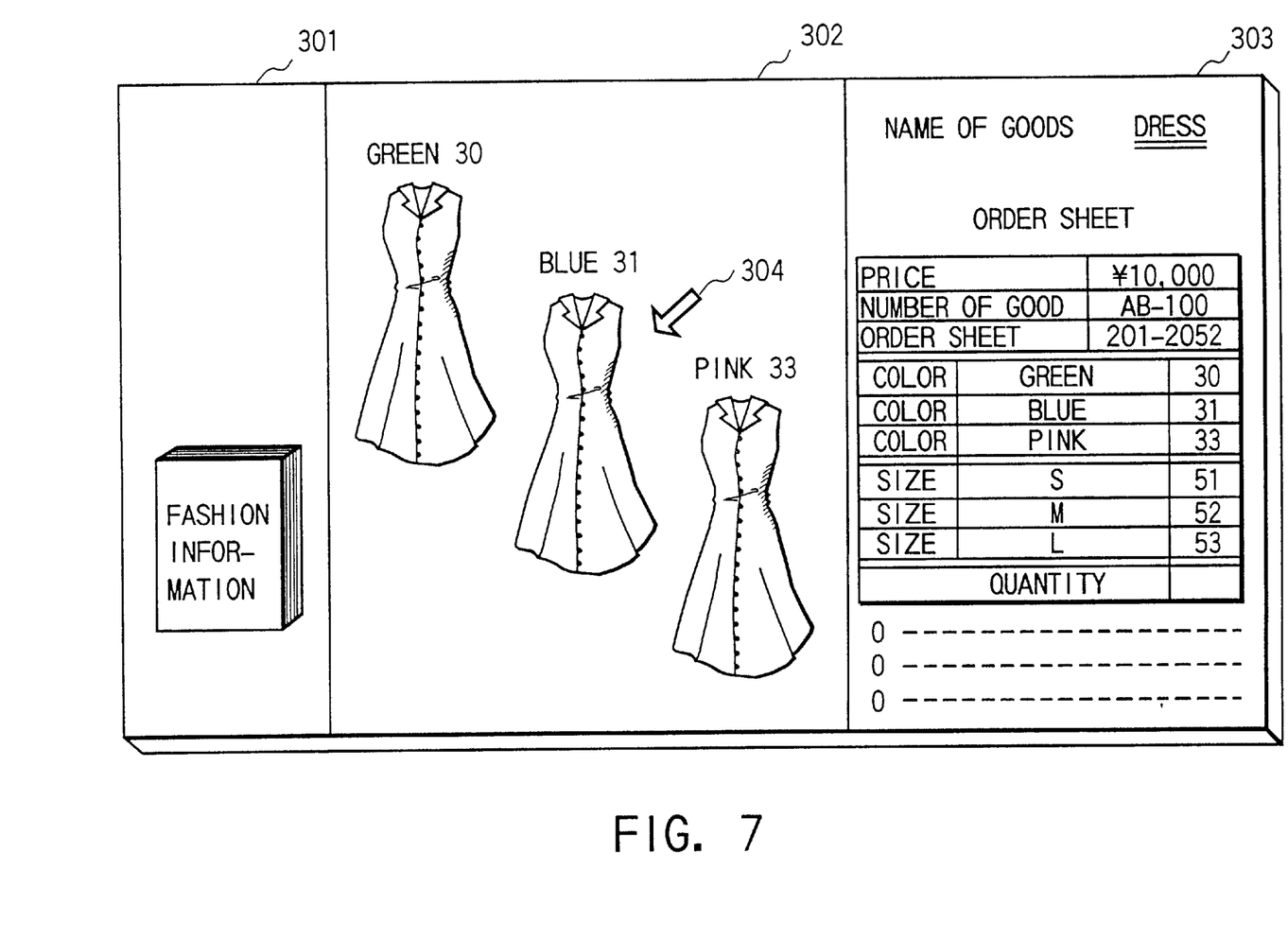
FIG. 7 is a view of a display screen showing catalog information according to the embodiment of the present invention.

FIG. 7 illustrates an example of a display screen of catalog information. In FIG. 7, 301 indicates a column for displaying the outward appearance of a catalog, 302 shows a column for displaying images of goods, and 303 denotes a column for displaying an order form.

As illustrated in FIG. 7, not only the images of the goods but also information such as the name, number, size, color, price of the goods are displayed on the column 302.

A cursor 304 is displayed on the display screen. When a desired good is displayed on the screen, a user operates, for example, the remote control 111 to move the cursor, then designates the particular good and input a user's desire to purchase it (step S11).

If the user's desire to purchase is inputted, then the communication program stored in the DVD 3 is read out by the DVD drive device 107 and started (step S12).

The read-out communication program is loaded into the CPU 104 and stored in the RAM 104. If the communication program is started, a telephone number of the mail-order firm stored in the DVD 3 is read out first (step S13).

Then, it is determined whether the user information such as a membership number, a zip code, an address, a name and a telephone number, is recorded in the memory 202 of the adapter 2 (step S14). If it is recorded, the flow goes to step S17 and, if not, an instruction to record the user's information is given to the user (step S15).

If the user inputs the user's information using, e.g., the remote control unit 111 in response to the instruction, then the user's information is recorded in the memory 202 through the communication interface 110 under the control of the CPU 104 (step S16). The flow advances to step S17.

In step S17, the final confirmation as to whether the goods desired in step S11 are to be purchased, is made to the user. If not, the flow returns to step S10 and the next catalog information is presented.

If, in step S17, the above final confirmation is made by the remote control unit 111, then the telephone number of the mail-order firm is dialed (step S18).

The telephone number of the mail-order firm, read out by the DVD 3 in step S13, is transmitted to the modem 201 of the adapter 2 through the communication interface 110 under the control of the CPU 104, and converted to a tone signal or a dial pulse by the modem 201. This signal or pulse is then sent to the telephone cable 5.

If as described above, a telephone connection is achieved from a user utilizing the DVD reproduction apparatus 1 to a mail-order firm, information about the goods to be purchased such as name, size, color, quantity, etc. of the goods and the user information recorded in the memory 202 are sent to the mail-order firm via the modem 201 and telephone cable 5 (step S19).

The information regarding the goods to be purchased is inputted by a user's operation of the remote control unit 111 and stored in the RAM 106, while the user information is recorded in the memory 202 as described above.

In step S19, the CPU 104 reads the information about the goods to be purchased out of the RAM 106, and also reads the user information out of the memory 202 through the communication interface 110 and sends it to the modem 201 through the communication interface 110.

The modem 202 converts the goods and user information into a predetermined signal form and sends the converted information to the telephone cable 5.

The goods and user information sent to the telephone cable 5, are transmitted to the mail-order firm via the telephone line connected in step S18. By doing so, a series of operations for ordering the goods is completed, and the telephone connection between the user and mail-order firm is terminated (step S20).

Since the user's information is recorded in the memory 202, it need not be inputted after the execution of the mail order, resulting in the substantial simplification of the mail-order operation.

Figure 8:
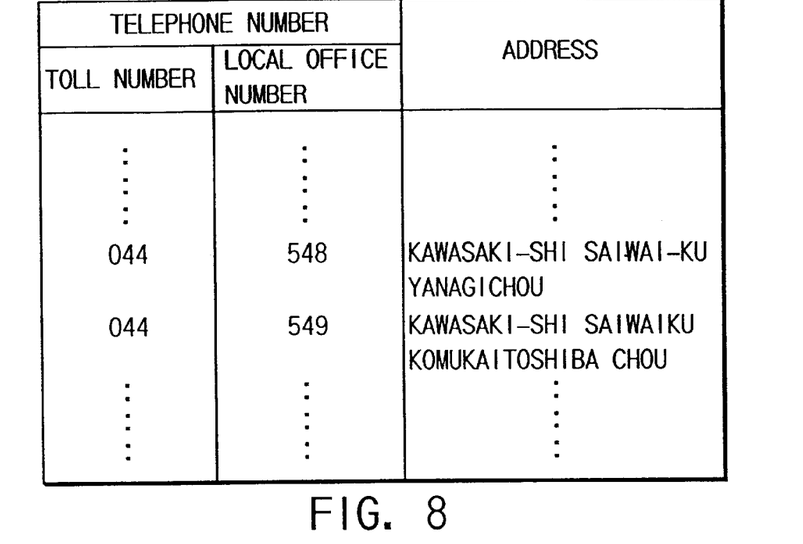
FIG. 8 is a table showing a database of addresses stored in a DVD for mail order according to the embodiment of the present invention.

In the embodiment described above, the user information can be registered in the memory 202 of the mail-order firm when the user purchases the adapter 2. When the user registers the user information by himself or herself after he or she purchases the adapter 2, especially when the user registers his or her address, the remote control unit 111 can be used from the beginning. However, as shown in FIG. 8, an address database including the place names (e.g., names of towns or streets) specified by to numbers (trunk codes) and local office numbers (office codes) of telephone numbers, can be stored in advance in the DVD 3, and the user's information can be recorded using the address database.

Figure 9:
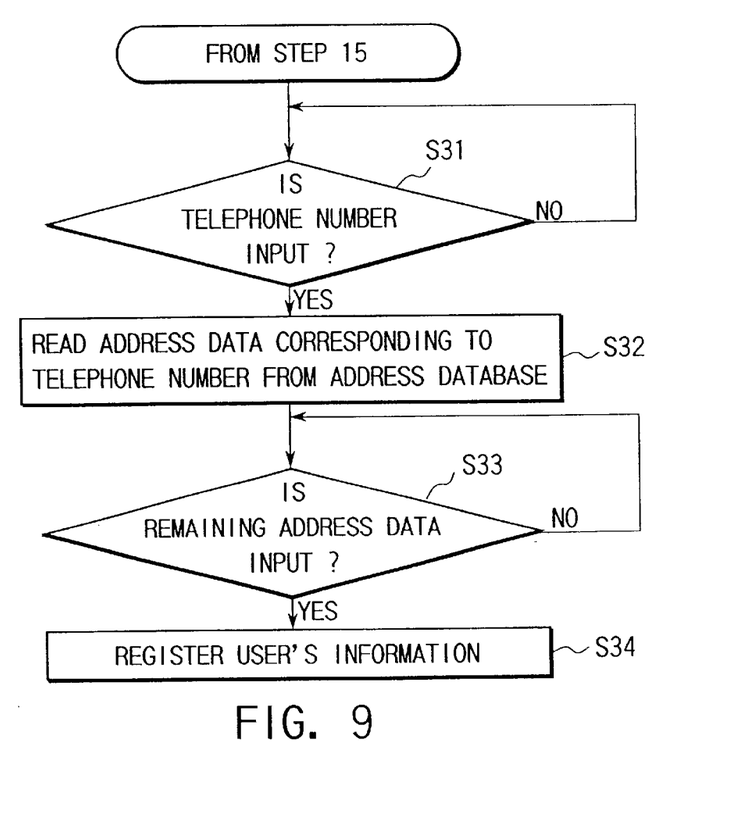
FIG. 9 is a flowchart of the procedure for the mail order shopping system according to the embodiment of the present invention.

FIG. 9 is a flowchart for explaining an operation of recording user's information using the above-described address database.

As described above, it is determined whether a telephone number is inputted when the user information is recorded (step S31). If the telephone number is inputted, address data corresponding to the inputted telephone number is read out from the address database stored in the DVD (step S32).

It is then determined whether the remaining address data such as a street number is inputted (step S33). If it is determined that the remaining address data is inputted, the user information is registered (step S34).

If a user inputs the user's telephone number when the user information is registered, its corresponding address data is read out of the address database and registered in the memory 202. The user therefore has only to input numeric parts of the address and the input operation is simplified.

In the foregoing embodiment, because the shopping system includes the memory 202 for registering user's information, the communication program stored in the DVD 3 is novel. More specifically, the programs representing the procedures of steps S13 to S19, shown in FIG. 6, are stored in the DVD 3.

In the foregoing embodiment, the access to the memory 202 of the adapter 2, that is, the writing (registration) and readout of user information are performed by the CPU 104 through the interface 110. In this case, the access to the memory 202 can be executed using the modem 201, as indicated by broken line arrow in FIGS. 3 and 4.

As one example, a DVD reproduction apparatus incorporating the adapter 2 as described above, can be constituted and, in this case, the memory 202 for recording user information can also serve as a memory for driving an IC used for a clock and for holding the stored contents by a backup battery used to hold other data.

In the above-described embodiment, a telephone number is used as recognition information of a mail-order house. The present invention is not limited to this. For example, an address of an electronic mail or a facsimile number can be used as the recognition information.

Furthermore, in the above embodiment, a DVD is used in the DVD reproduction apparatus. However, it can be used, as a ROM, in personal computers.

A user's telephone number or the like is used as user information. The user information can include the number of a credit card.

The mail-order shopping system of the present invention can be applied to a cable television.

A telephone connection is employed to transfer the goods information and user's information. This information can be transferred using a PHS (personal handy-phone shopping system).

Various changes and modification to the present invention can be made.

As described above, according to the mail-order shopping system of the present invention, an electronic mail order can be made only be a simple input operation by combining a simple, small and inexpensive adapter including both a low-speed modem and a memory for recording user's information with a DVD reproduction apparatus.

Since a DVD is a medium capable of storing still and dynamic images of high quality, the tone of goods, the feel of material thereof, the feel of use thereof, etc. can be known exactly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A mail-order shopping system comprising:
    a reproduction section for reproducing catalog information, adapted to be obtained from a first storage medium storing the catalog information of different goods, recognition information of a mail-order firm, and a communication program representing a procedure enabling a user to communicate with said mail-order firm;
    a designation section for designating user-selected goods from the catalog information reproduced by said reproduction section;
    a memory for storing user information specifying a user; and
    a transmission section for transmitting said user-selected goods information, designated by said designation section, and said user information, stored in said memory, to the mail-order firm, wherein said transmission section uses said communication program and said mail-order firm recognition information, both stored in said first storage medium, to transmit said user information and said user-selected goods information to said mail-order firm.

2. The mail-order shopping system according to claim 1, wherein said recognition information is at least one of a telephone number, an address of an electronic mail and a facsimile number of the mail-order firm.

3. The mail-order shopping system according to claim 1, wherein said first storage medium is a DVD.

4. The mail-order shopping system according to claim 1, wherein said user's information is information including user's membership number, zip code, name, and telephone number.

5. The mail-order shopping system according to claim 1, wherein said memory is a nonvolatile memory.

6. The mail-order shopping system according to claim 1, wherein said memory is a random-access memory (RAM) having a backup power supply.

7. A mail-order shopping system comprising:
    a reproduction section for reproducing catalog information, adapted to be obtained from a first storage medium storing the catalog information of different goods, recognition information of a mail-order firm, and a communication program representing a procedure enabling a user to communicate with said mail-order firm;
    a designation section for designating user-selected goods from the catalog information reproduced by said reproduction section;
    a memory for storing user information specifying a user;
    a determination section for determining whether said user information is stored in said memory;
    an instruction section for instructing the user to register said user information when said determination section determines that said user information is not stored in said memory;
    a registration section for registering said user information in said memory when said instruction section instructs the user to register said user information; and
    a transmission section for transmitting said user-selected goods information, designated by said designation section, and said user information, stored in said memory, to the mail-order firm, wherein said transmission section uses said communication program and said mail-order firm recognition information, both stored in said first storage medium, to transmit said user information and said user-selected goods information to said mail order firm.

8. The mail-order shopping system according to claim 7, wherein said recognition information is at least one of a telephone number, an address of an electronic mail and a facsimile number of the mail-order firm.

9. The mail-order shopping system according to claim 7, wherein said first storage medium is a DVD.

10. The mail-order shopping system according to claim 7, wherein said user's information is information including user's membership number, zip code, name, and telephone number.

11. The mail-order shopping system according to claim 7, wherein said memory is a nonvolatile memory.

12. The mail-order shopping system according to claim 7, wherein said memory is a random-access memory (RAM) having a backup power supply.

13. A mail-order shopping system comprising:
    a reproduction apparatus for reproducing catalog information of different goods, recognition information of a mail-order firm, and a communication program adapted to be obtained from a mail-order shopping medium in which said catalog information, said mail-order firm recognition information, and said communication program are stored, said communication program representing a procedure enabling a user to communicate with said mail-order firm;

a selection section for selecting user-desired goods from among the catalog information reproduced by said reproduction apparatus;

a memory for registering user information specifying a user; and a modem for communicating between said reproduction apparatus and the-mail-order firm, wherein the reproduction apparatus transmits both information of the user-desired goods, selected by said selection section, and the user information, registered in said memory, to the mail-order firm through said modem, said reproduction apparatus using said communication program and said mail-order firm recognition information, both stored in said mail-order shopping medium, to transmit said user information and said user-desired goods information to said mail order firm.

14. The mail-order shopping system according to claim 13, wherein said recognition information is at least one of a telephone number, an address of an electronic mail and a facsimile number of the mail-order firm.

15. The mail-order shopping system according to claim 13, wherein said user's information is information including user's membership number, zip code, name, and telephone number.

16. The mail-order shopping system according to claim 13, wherein said memory is a nonvolatile memory.

17. The mail-order shopping system according to claim 13, wherein said memory is a RAM having a backup power supply.

18. A mail-order shopping system comprising:

a reproduction apparatus for reproducing catalog information of different goods, recognition information of a mail-order firm, and a communication program adapted to be obtained from a mail-order shopping medium in which said catalog information, said mail-order firm recognition information, and said communication program are stored, said communication program representing a procedure enabling a user to communicate with said mail-order firm;

a memory for registering user information, specifying a user, and user-desired goods, selected from said catalog information; and a modem for communicating between said reproduction apparatus and the-mail-order firm, wherein said communication program causes said reproduction apparatus to read said mail-order firm recognition information stored in said mail-order shopping medium and causes said modem to transmit both said user information and said user-desired goods information, registered in the memory, to said mail-order firm after a line is connected to mail-order firm based on said mail-order firm recognition information read by said reproduction apparatus.

19. The mail-order shopping system according to claim 18, wherein said recognition information is at least one of a telephone number, an address of an electronic mail and a facsimile number of the mail-order firm.

20. The mail-order shopping system according to claim 18, wherein said user's information is information including user's membership number, zip code, name, and telephone number.

21. The mail-order shopping system according to claim 18, wherein said memory is a nonvolatile memory.

22. The mail-order shopping system according to claim 18, wherein said memory is a RAM having a backup power supply.

23. A mail-order shopping system comprising:

a reproduction apparatus for reproducing catalog information of different goods, recognition information of a mail-order firm, and a communication program adapted to be obtained from a mail-order shopping medium in which said catalog information, said mail-order firm recognition information, and said communication program are stored, said communication program representing a procedure enabling a user to communicate with said mail-order firm;

a memory for registering user information, specifying a user, and user-desired goods, selected from said catalog information; and a modem for communicating between said reproduction apparatus and the-mail-order firm, wherein said communication program causes said reproduction apparatus to check whether said user information is registered in the memory and causes said reproduction apparatus to read said mail-order firm recognition information stored in the mail-order shopping medium when said user information is stored in the memory and causes said modem to transmit both said user information stored in the memory and information of desired goods to said mail-order firm after a line is connected to said mail-order firm by using said mail-order recognition information stored in the mail-order shopping medium.

24. The mail-order shopping system according to claim 23, wherein said recognition information is at least one of a telephone number, an address of an electronic mail and a facsimile number of the mail-order firm.

25. The mail-order shopping system according to claim 23, wherein said user's information is information including user's membership number, zip code, name, and telephone number.

26. The mail-order shopping system according to claim 23, wherein said memory is a nonvolatile memory.

27. The mail-order shopping system according to claim 23, wherein said memory is a RAM having a backup power supply.

28. A mail-order shopping system comprising:

a reproduction section for reproducing catalog information, recognition information, a communication program, and an address database from a first storage medium storing the catalog information of different goods, recognition information of a mail-order firm, communication program representing a procedure for enabling a user to communicate with the mail-order firm, and an address database describing address data corresponding to the mail-order recognition information;

a designation section for designating user-desired goods from the catalog information reproduced by said reproduction section;

a memory for storing user information specifying a user;

a determination section for determining whether said user information is stored in said memory;

an instruction section for instructing the user to register said user information when said determination section determines that said user information is not stored in said memory;

a registration section for registering said user information in said memory, using both said user information and said address database stored in said first storage medium, when said instruction section instructs the user to register said user information; and a transmission section for transmitting said mail-order firm recognition information, user-desired goods information designated by said designation section, and said user information registered in said memory by said registration section, to the mail-order firm by using the communication program stored in said first storage medium.

29. The mail-order shopping system according to claim 28, said recognition information is at least one of a telephone number, an address of an electronic mail and a facsimile number of the mail-order firm.

30. The mail-order shopping system according to claim 28, wherein said first storage medium is a DVD.

31. The mail-order shopping system according to claim 28, wherein said user's information is information including user's membership number, zip code, name, and telephone number.

32. The mail-order shopping system according to claim 28, wherein said memory is a nonvolatile memory.

33. The mail-order shopping system according to claim 28, wherein said memory is a random-access memory (RAM) having a backup power supply.

34. A computer readable medium for mail-order shopping, in which catalog information of different goods, recognition information of a mail-order firm, and a communication program representing a procedure for communication from a user to the mail-order firm, are stored, wherein said communication program comprises:

first instruction means for instructing a reproduction apparatus to read the mail-order firm recognition information stored in the computer readable medium; and second instruction means for instructing a modem to transmit both user information and information of desired goods, registered in advance in a memory, to the mail-order firm after a line is connected to the mail-order firm by using the recognition information of the mail-order firm read by the reproduction apparatus.

35. A computer readable medium for mail-order shopping, in which catalog information of different goods, recognition information of a mail-order firm, and a communication program representing a procedure for communication from a user to the mail-order firm, are stored, wherein said communication program comprises:

first instruction means for instructing a reproduction apparatus to read the mail-order firm recognition information stored in the computer readable medium; and second instruction means for checking whether user information for specifying the user is registered in a memory and for causing a modem to transmit both the user information and information of user-desired goods to the mail-order firm when the user information is registered in the memory, wherein said modem transmits said user and user-desired information after a line is connected to the mail-order firm by using the recognition information of the mail-order firm read by the reproduction apparatus.

36. A computer readable medium for mail-order shopping, in which catalog information of different goods, recognition information of a mail-order firm, and a communication program representing a procedure for communication from a user to the mail-order firm, are stored, wherein said communication program comprises:

first instruction means for instructing a reproduction apparatus to read the recognition information of the mail-order firm stored in the computer readable medium;

second instruction means for instructing a modem to dial the mail-order firm recognition information read by said reproduction apparatus for connecting the reproduction apparatus to the mail-order firm via a line; and third instruction means for instructing the modem to transmit both user information for specifying the user and information of user-desired goods to the mail-order firm after the line is connected to the mail-order firm by dialing the mail-order firm recognition information.

37. A mail-order shopping system comprising:

a first storage medium for storing catalog information of different goods, recognition information of a mail-order firm, and a communication program for communicating with said mail-order firm;

a reproduction section for reproducing catalog information from said first storage medium;

a designation section for designating user-selected goods from the catalog information reproduced by said reproduction section;

a memory for storing user information specifying a user; and a transmission section for automatically transmitting said user-selected goods information, designated by said designation section, and said user information, stored in said memory, to the mail-order firm, wherein, upon user confirming user-selected goods information, said transmission section utilizes said communication program and said mail-order firm recognition information, both stored in said first storage medium, to automatically transmit said user information and said user-selected goods information to the mail-order firm.

* * * * *